(No Model.)
J. S. KIDD.
SPROCKET WHEEL AND CHAIN.
No. 599,612. Patented Feb. 22, 1898.
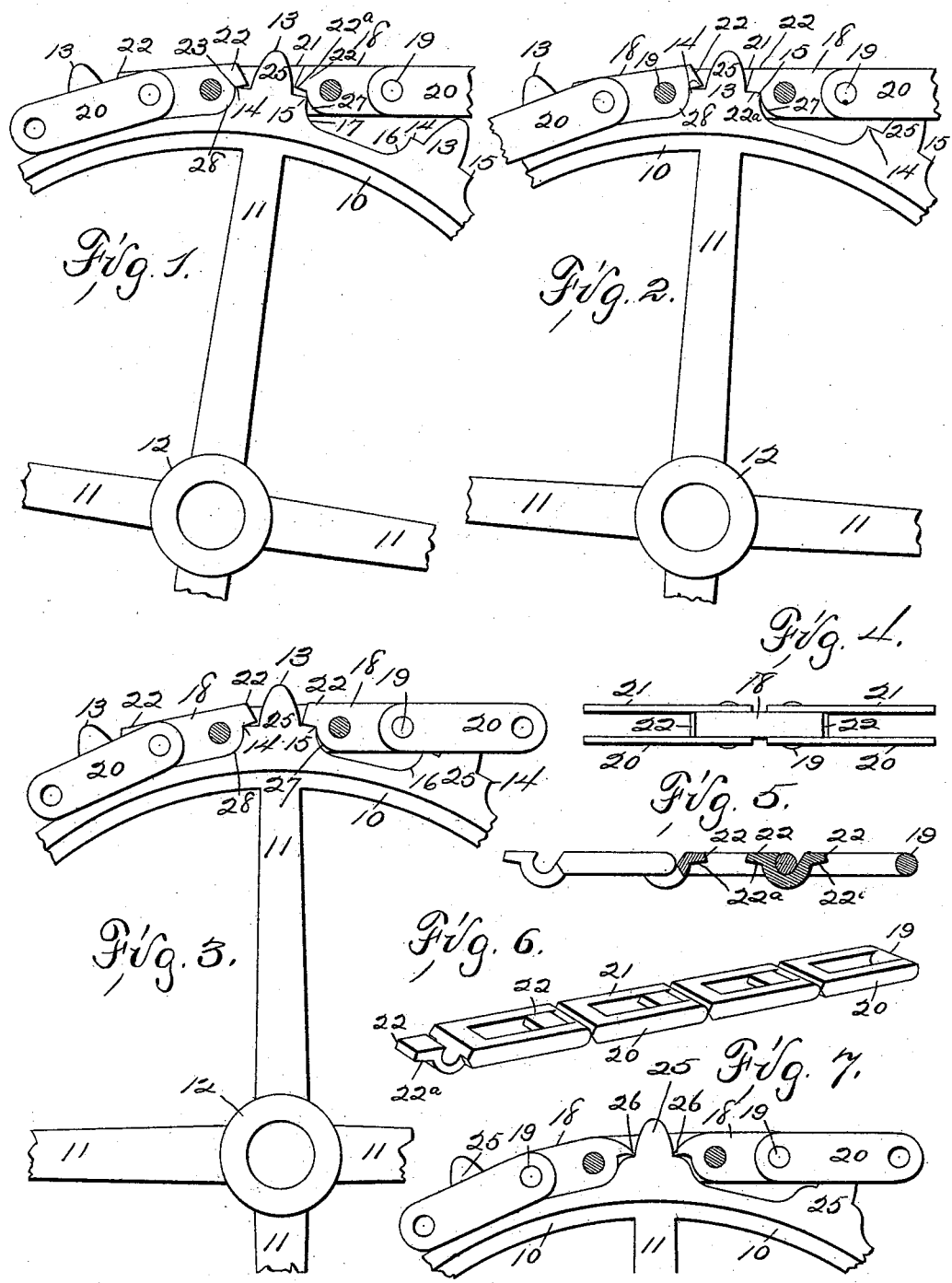

UNITED STATES PATENT OFFICE.

JOHN S. KIDD, OF DES MOINES, IOWA.

SPROCKET WHEEL AND CHAIN.

SPECIFICATION forming part of Letters Patent No. 599,612, dated February 22, 1898.

Application filed July 7, 1897. Serial No. 643,755. (No model.)

*To all whom it may concern:*

Be it known that I, JOHN S. KIDD, a citizen of the United States of America, and a resident of Des Moines, in the county of Polk and State of Iowa, have invented a new and useful Sprocket Wheel and Chain, of which the following is a specification.

The object of this invention is to provide knife-edge bearings between chain-links and sprocket-teeth in an apparatus composed of a sprocket-wheel and a link-belt chain.

My invention consists in the construction, arrangement, and combination of elements hereinafter set forth, pointed out in my claims, and illustrated by the accompanying drawings, in which—

Figure 1 is an elevation illustrating a portion of a chain mounted on a portion of a sprocket-wheel, some of the side links of the chain being removed more clearly to demonstrate the relations between the chain-links and wheel-teeth. Figs. 2 and 3 are similar views to Fig. 1, illustrating different relative positions of the wheel and chain in the rotation of the wheel. Fig. 4 is a plan of a portion of the chain. Fig. 5 is an elevation, partly in section, of a modified form of one of the chain-links. Fig. 6 is a perspective illustrating the form of device shown in Fig. 5. Fig. 7 is an elevation of a further-modified form of my device.

In the construction of the device as shown in Figs. 1, 2, 3, and 4 the numeral 10 designates the rim, 11 the spokes, and 12 the hub, of a sprocket-wheel, which may be of any desirable material and common construction. Located at equal distances of separation on the rim 10 of the wheel are a plurality of sprocket-teeth 13, each of which teeth is provided with a corner or marginal edge portion at the front and rear thereof, which corners are designated by the numerals 14 15 and extend transversely of the rim of the wheel. Each of the corners 14 15 of the sprocket-teeth is angular and adjoins curved faces 16 17 of the wheel-rim between and at the lines of demarcation with the teeth. The corners 14 15 of the sprocket-teeth should be case-hardened or tempered to such a degree as to resist to a maximum extent wear and friction upon contacting elements, such as the chain-links hereinafter described, and the outer or peripheral faces thereof are plane and arranged approximately at right angles with the radii of the wheel intersecting said corners.

My chain is composed of a series of solid links 18, connected by pins or pivots 19 to the side links 20 21. Each of the solid links has a tongue, lip, or projection 22 at each of its ends, which tongue has a plane lower surface $22^a$ and extends beyond the periphery of the end of the lower portion of the link and forms with said periphery and at the line of demarcation therewith an angular seat 23. The tongues 22 and portions of the solid links 18, forming and adjacent to the angular seats 23, should be case-hardened or tempered to such a degree as to resist to a maximum extent wear from and friction upon the corners or margins 14 15 of the sprocket-teeth with which they contact.

Each sprocket-tooth is made, as shown, with an extension or tip 25 radially projecting from the face thereof, and said tip serves to guide the chain to and upon the sprocket-wheel.

When the wheel-teeth are formed as shown in Fig. 7, a modified form of construction may be employed to advantage—as, for instance, providing an acute angle or corner 26 on the lip, tongue, or projection of the solid link 18, engaging in a seat at the line of demarcation between the tip 25 and the normal face of the wheel-tooth. In this instance the corner or angle of the link should be case-hardened or tempered as well as the seat with which it contacts.

The plane faces $22^a$ of the tongues 22 are always tangential to the orbit of travel of said faces around the axis of the sprocket-wheel.

In Figs. 5 and 6 I have shown how to form the tongues, lips, or projections 22 on common detachable members of a link-belt chain, so that said chain will coact with my improved form of wheel and be engaged by the knife-edge bearings on the teeth thereof.

In practical use a chain approaching the wheel will be engaged by the face $22^a$, resting flat on the outer face of the corner 15, the said corner being in close proximity to the seat 23, and in the further travel of the wheel the chain will turn on the corner 15, said corner contacting with the seat 23, and will then roll on its peripheral portion 27, in contact with the peripheral portion 17 of the wheel, into a seated position on the wheel-rim, and in this seated position the peripheral portion 28 of the link 18 will rest in a peripheral seat 16 of the wheel-rim, and the rear seat 23 of the link 18 will be engaged by the corner 14 of a sprocket-tooth. When the chain leaves the sprocket-wheel, the contact, wear, and strain will come upon the points 14 15 of the wheel-teeth and the seats 23 of the links 18.

If the points or corners of the teeth are tempered or hardened and the seats 23 of the links 18 likewise are tempered or hardened, the wear will come upon and the strain will be borne by these tempered or hardened portions, thereby minimizing and practically doing away with the wear of the parts.

By the construction illustrated and described I am enabled to confine the frictional wear between the links and wheel to the hardened or tempered contacting points or knife-edges, thereby limiting, minimizing, and reducing to a large degree the friction between the members.

By hardening or tempering portions only at the corners of the teeth I avoid weakening the wheel, as would be the case were the entire wheel hardened to the same degree, and for this reason I believe it preferable to confine the hardening process to limited portions of the teeth, and the same practical advantage is obtained in hardening seats or portions of limited extent on the chain-links.

I claim as my invention—

1. A sprocket-wheel having a periphery formed with curved depressions and angular corners, in combination with a chain formed with curved margins fitting to the curved depressions of the wheel and angular depressions fitting to and arranged to be engaged by the angular corners of the wheel, which corners on the wheel and depressed portions of the chain are case-hardened or tempered.

2. A sprocket-wheel provided with like teeth, each of which teeth is formed with angular corners fore and aft thereof and arranged transversely of the rim of the wheel, in combination with a chain formed with a series of like solid links having longitudinally-projecting tongues or lips on the ends thereof, the chain and wheel being relatively so arranged as that the outer faces of the corners on the teeth engage the inner faces of the lips of the solid links and pivot thereon at the lines of demarcation between the tongues or lips and the bodies of the solid links.

3. A sprocket-wheel provided with teeth formed with corners located intermediate of the radial lengths of said teeth at the front and rear thereof, in combination with a chain having links formed with lips or tongues thereon and projecting longitudinally thereof, the wheel and chain being relatively so arranged as that the corners of the wheel-teeth engage the chain at the intersection of the lips and link-body, whereby the chain-links pivot on the wheel-teeth.

4. In a device of the class described, a chain-link having longitudinally-projecting tongues, lips or studs with plane faces adjoining curved faces on the link, in combination with a wheel provided with sprockets having shoulders thereon with angular corners forming knife-edge bearings arranged to engage the link at the intersection of the plane face of the lip and the curved face of the link-body.

5. In a device of the class described, a sprocket-wheel and a sprocket-chain formed with coacting corners and depressions providing pivotal connections between the wheel and chain approximately at the pitch-line of the wheel, which corners and depressed portions are case-hardened or tempered.

6. A chain composed of a series of like solid links having lips or tongues projecting from the ends thereof and connected by a series of side bars or links so shaped and arranged as to receive successive teeth of a sprocket-wheel within and between the side bars or links and in knife-edge engagement with the lips or tongues approximately at the pitch-line of the wheel.

7. A sprocket-wheel having a series of teeth, each tooth formed with a shoulder, in combination with a chain having a series of solid links, each link formed with a lip, the shoulder and lip being arranged for mutual contact and so shaped that the one pivots upon the other in the approach and departure of the chain relative to the wheel.

8. A chain composed of a series of like solid links detachably and replaceably connected, each of which links is so shaped as to provide an opening or seat for a sprocket-tooth, and lips, tongues or projections formed on the links and projecting inwardly into the opening thereof, which lips, tongues or projections are case-hardened or tempered.

JOHN S. KIDD.

Witnesses:
S. C. SWEET,
W. C. ELLIS.